United States Patent
Kim et al.

(10) Patent No.: US 11,262,636 B2
(45) Date of Patent: Mar. 1, 2022

(54) TRANSMITTANCE-VARIABLE FILM AND USE THEREOF

(71) Applicant: LG Chem, Ltd., Seoul (KR)

(72) Inventors: Jung Doo Kim, Daejeon (KR); Hyun Jun Lee, Daejeon (KR); Yeon Keun Lee, Daejeon (KR); Joo Hyun Lee, Daejeon (KR); Dong Hyun Oh, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/768,409

(22) PCT Filed: Dec. 19, 2018

(86) PCT No.: PCT/KR2018/016216
§ 371 (c)(1),
(2) Date: May 29, 2020

(87) PCT Pub. No.: WO2019/124961
PCT Pub. Date: Jun. 27, 2019

(65) Prior Publication Data
US 2020/0319504 A1  Oct. 8, 2020

(30) Foreign Application Priority Data
Dec. 20, 2017 (KR) .......... 10-2017-0175931

(51) Int. Cl.
G02F 1/137 (2006.01)
C09J 7/38 (2018.01)
(Continued)

(52) U.S. Cl.
CPC ........ *G02F 1/13725* (2013.01); *B32B 27/285* (2013.01); *C09J 7/385* (2018.01);
(Continued)

(58) Field of Classification Search
CPC .......... G02F 1/133528; G02F 1/13475; G02F 1/13725; G02F 2202/28; G02F 2203/01; C09J 7/385; C09J 133/066
See application file for complete search history.

(56) References Cited

U.S. PATENT DOCUMENTS 6,045,895 A * 4/2000 Hyde ................. B32B 7/12
428/213
2003/0202142 A1* 10/2003 Ishii ................. G02F 1/13439
349/122
(Continued)

FOREIGN PATENT DOCUMENTS

CN  106104329 A * 11/2016 .......... C09J 133/066
EP  1735156 A2  12/2006
(Continued)

OTHER PUBLICATIONS

European Search Reprt ofr Application No. 18891510.2, dated Oct. 27, 2020, 8 pages.
(Continued)

*Primary Examiner* — Sophie Hon
(74) *Attorney, Agent, or Firm* — Lerner, David, Littenberg, Krumholz & Mentlik, LLP

(57) ABSTRACT

A transmittance-variable film having a double-cell structure or a single-cell structure capable of suppressing formation of bubbles inside a liquid crystal layer or at the interface between a base film and a pressure-sensitive adhesive layer under high-temperature and high-humidity reliability conditions is provided. An exemplary transmittance-variable film can be applied to various applications, including various construction or automotive materials that require control of transmittance, or eyewear, such as augmented reality experience or sports goggles, sunglasses or helmets.

14 Claims, 7 Drawing Sheets

(51) Int. Cl.
  *B32B 27/28* (2006.01)
  *G02F 1/1335* (2006.01)
  *G02F 1/1337* (2006.01)
  *G02F 1/1347* (2006.01)

(52) U.S. Cl.
  CPC ........ *G02F 1/1337* (2013.01); *G02F 1/13475* (2013.01); *G02F 1/133528* (2013.01); *G02F 2202/28* (2013.01); *G02F 2203/01* (2013.01)

(56) References Cited

U.S. PATENT DOCUMENTS

| | | |
|---|---|---|
| 2008/0033109 A1 | 2/2008 | Tomita et al. |
| 2013/0323521 A1 | 12/2013 | Xia et al. |
| 2016/0200949 A1 | 7/2016 | Lee et al. |
| 2016/0230049 A1* | 8/2016 | Husemann ......... C08G 18/6229 |
| 2017/0184929 A1* | 6/2017 | Suzuki ................ G02F 1/13306 |
| 2017/0253771 A1* | 9/2017 | Lee ............................. C09J 4/06 |
| 2018/0354229 A1 | 12/2018 | Onishi et al. |
| 2019/0049641 A1* | 2/2019 | Oh ........................ G02B 6/293 |

FOREIGN PATENT DOCUMENTS

| | | | |
|---|---|---|---|
| EP | 3385781 A1 | 10/2018 | |
| EP | 3467578 A1 | 4/2019 | |
| JP | 2014224179 A | 12/2014 | |
| KR | 20100058882 A | 6/2010 | |
| KR | 20140012670 A | 2/2014 | |
| KR | 20160048862 A | 5/2016 | |
| KR | 20160078686 A | 7/2016 | |
| KR | 20170064744 A | 6/2017 | |
| KR | 20170117893 A | 10/2017 | |
| KR | 20170133691 A | 12/2017 | |
| KR | 102101149 B1 * | 4/2020 | ......... G02F 1/13725 |
| TW | 201728727 A | 8/2017 | |
| WO | 2005102688 A2 | 11/2005 | |
| WO | 2006009250 A1 | 1/2006 | |
| WO | 2015141381 A1 | 9/2015 | |
| WO | WO-2016039521 A * | 3/2016 | ................ C09J 4/06 |
| WO | 2016148208 A1 | 9/2016 | |
| WO | 2017033997 A1 | 3/2017 | |
| WO | 2017179940 A1 | 10/2017 | |
| WO | WO-2017179940 A1 * | 10/2017 | ........... G02F 1/1337 |
| WO | 2017203809 A1 | 11/2017 | |

OTHER PUBLICATIONS

Taiwanese Search Report for TW0820615150 dated Jun. 28, 2019; 1 page.

International Search Report for PCT/KR2018/016216 dated Mar. 27, 2019; 3 pages.

* cited by examiner

[Figure 1]
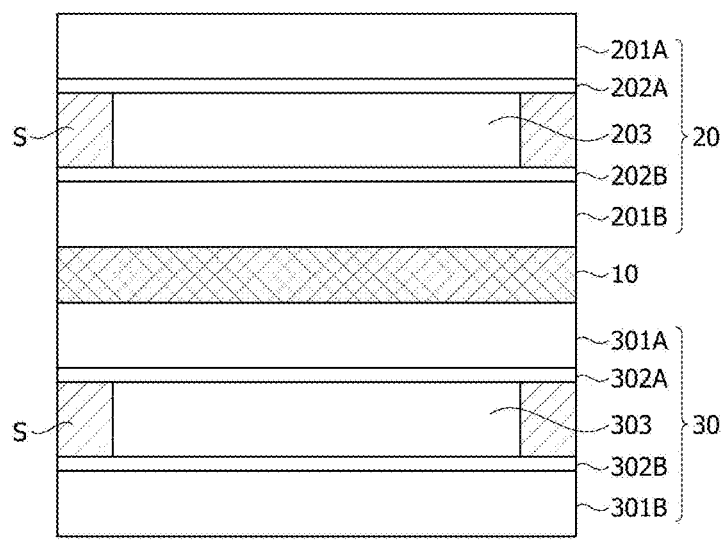
[Figure 2]
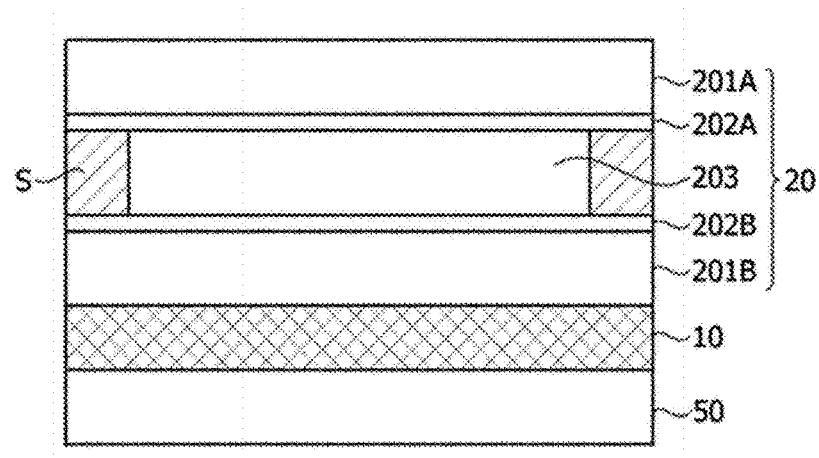

[Figure 3]
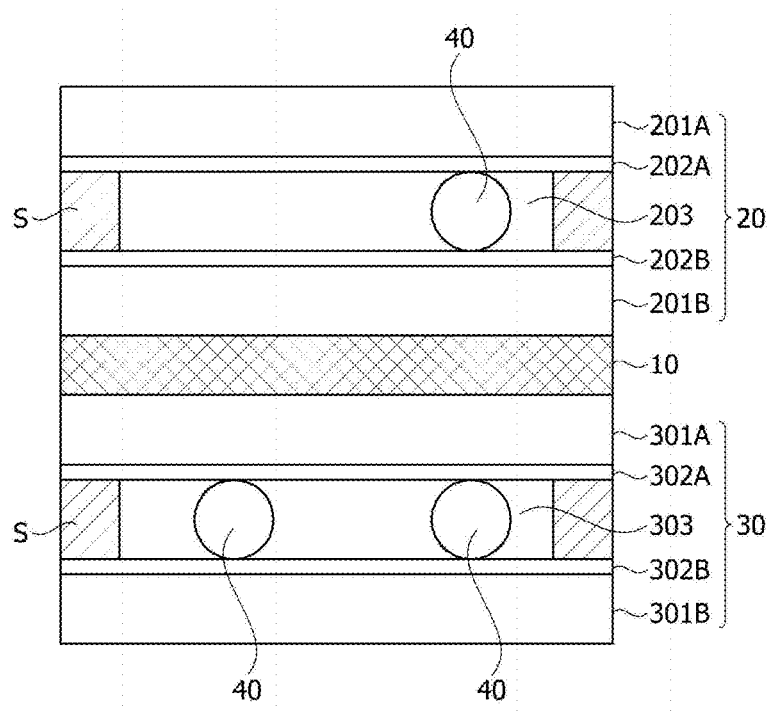
[Figure 4]
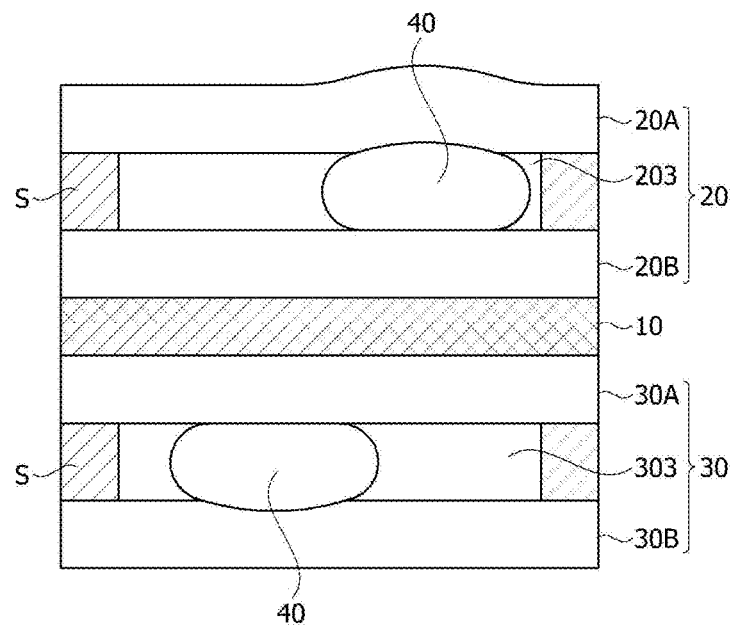

[Figure 5]
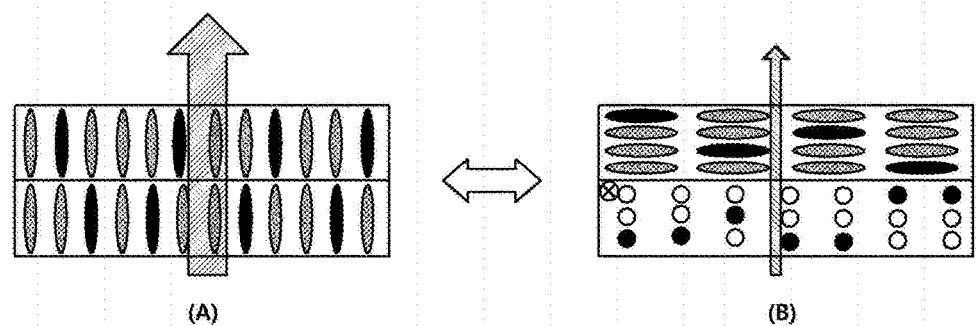
[Figure 6]
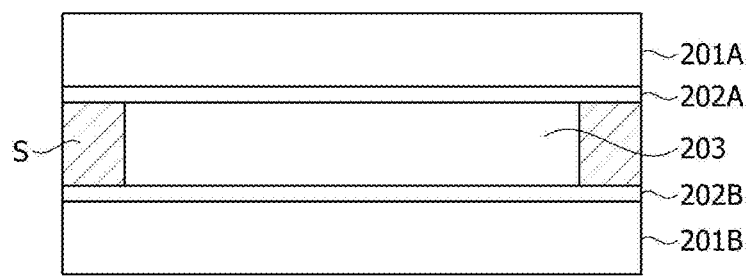
[Figure 7]
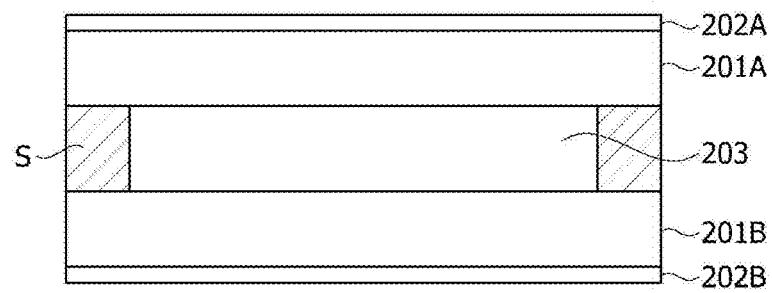

[Figure 8]
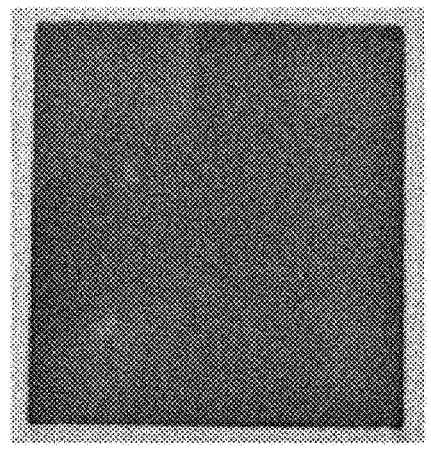 
(A)          (B)

[Figure 9]
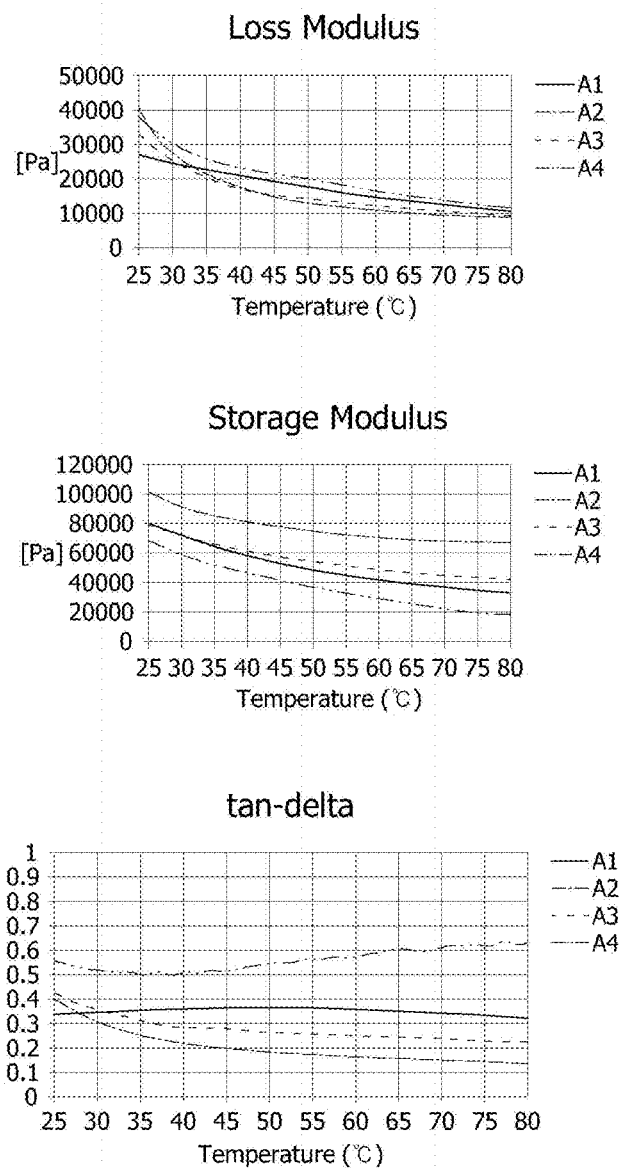

[Figure 10]
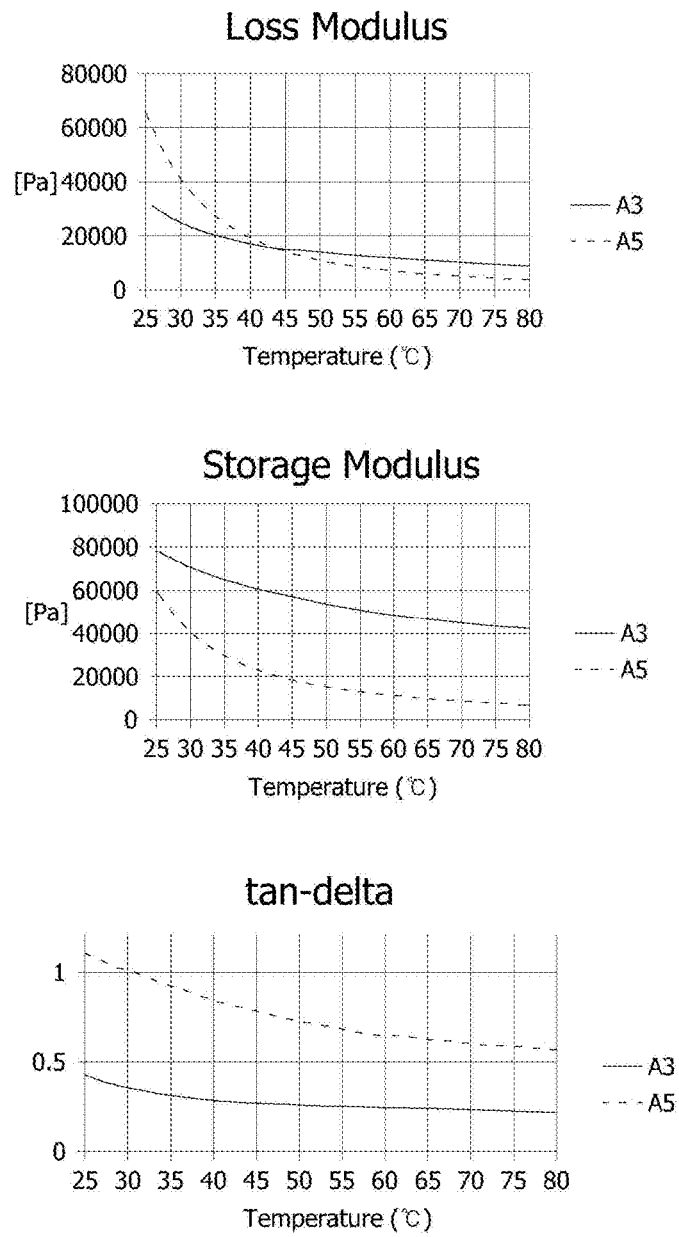

[Figure 11]
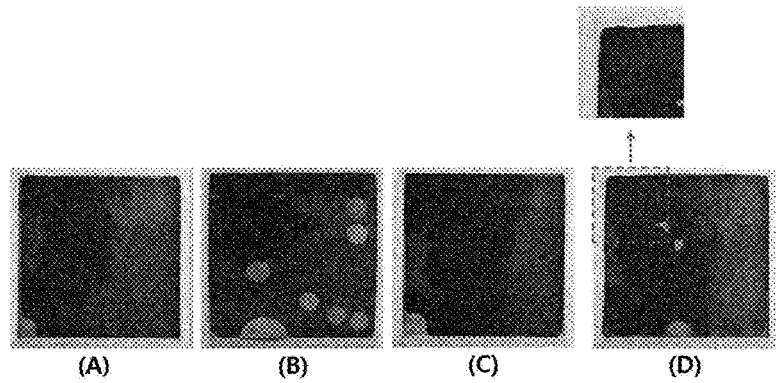
[Figure 12]
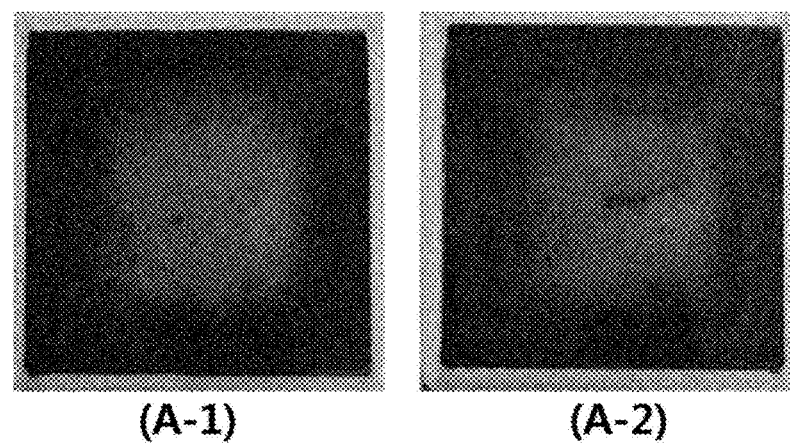
[Figure 13]
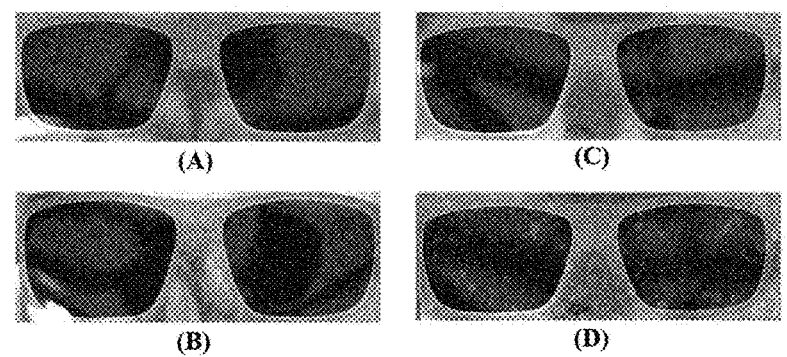

TRANSMITTANCE-VARIABLE FILM AND USE THEREOF

CROSS-REFERENCE TO RELATED APPLICATION(S)

The present application is a national phase entry under 35 U.S.C. § 371 of International Application No. PCT/KR2018/016216, filed on Dec. 19, 2018, which claims priority from Korean Patent Application No. 10-2017-0175931 filed on Dec. 20, 2017, the disclosures of which are incorporated by reference herein.

TECHNICAL FIELD

The present application relates to a transmittance variable film and a use thereof.

BACKGROUND ART

The transmittance-variable film may mean a film capable of varying the transmittance to sunlight depending on whether or not external energy is applied (Patent Document 1: Korean Patent Laid-Open Publication No. 10-2010-0058882).

The transmittance-variable film using liquid crystals may comprise a liquid crystal layer including liquid crystals and a dichroic dye between two oppositely arranged electrode films (for example, having a structure in which an electrode layer is formed on a base film), where the liquid crystals are oriented depending on whether or not a voltage is applied and the dichroic dye is simultaneously oriented, so that the transmittance can be varied.

The transmittance-variable film having a single-cell structure including one liquid crystal cell has a limited transmittance-variable range of about 70% to 25% or so depending on whether or not a voltage is applied. Therefore, even if the voltage is applied to reduce the transmittance to 25% or so, the light is seen to be transmitted in bright daylight. The transmittance-variable film having a double-cell structure including two liquid crystal cells may exhibit the transmittance lower than that of the transmittance-variable film with a single-cell structure. Furthermore, even in the case of using the transmittance-variable film having a single-cell structure, it may be necessary to attach various optical functional films (for example, having a structure in which an optical functional layer is formed on one side of a base film).

A pressure-sensitive adhesive may be used for attaching an optical functional film to a transmittance-variable film with a single-cell structure or attaching two liquid crystal cells in a double-cell structure. However, due to the air contained in the base film and the pressure-sensitive adhesive, air bubbles may be generated inside the liquid crystal layer or at the interface between the base film and the pressure-sensitive adhesive under high-temperature and high-humidity reliability conditions.

DISCLOSURE

Technical Problem

The present application provides a transmittance-variable film having a double-cell structure or a single-cell structure capable of suppressing formation of bubbles inside a liquid crystal layer or at the interface between a base film and a pressure-sensitive adhesive layer under high-temperature and high-humidity reliability conditions, and a use thereof.

BRIEF DESCRIPTION OF DRAWINGS

FIG. 1 illustratively shows an exemplary transmittance-variable film of the present application.

FIG. 2 illustratively shows an exemplary transmittance-variable film of the present application.

FIG. 3 is a schematic diagram for explaining bubble generation inside a liquid crystal layer FIG. 4 is a schematic diagram for explaining bubble generation inside a liquid crystal layer FIG. 5 illustratively shows a transmittance-variable principle.

FIG. 6 illustratively shows the structure of Reference Example 1.

FIG. 7 illustratively shows the structure of Reference Example 2.

FIG. 8 is the bubble generation evaluation results of Reference Example 1 and Reference Example 2.

FIG. 9 shows loss moduli, storage moduli and tan δ values of Pressure-sensitive adhesives 1 to 4 according to temperature.

FIG. 10 shows loss moduli, storage moduli and tan δ values of Pressure-sensitive adhesives 3 and 5 according to temperature.

FIG. 11 is the bubble generation evaluation results of Examples 1 and 2 and Comparative Examples 1 and 2.

FIG. 12 is the bubble generation revalidation evaluation results of Example 1.

FIG. 13 is the bubble generation evaluation results of Example 3 and Comparative Example 3.

TECHNICAL SOLUTION

The present application relates to a transmittance-variable film. Hereinafter, the transmittance-variable film of the present application is exemplarily described with reference to the accompanying drawings, and the accompanying drawings are illustrative, and the transmittance-variable film of the present application is not limited to the attached drawings.

An exemplary transmittance-variable film may comprise a liquid crystal cell sequentially including a first substrate, a liquid crystal layer and a second substrate, and a pressure-sensitive adhesive layer disposed on one side of the liquid crystal layer. The liquid crystal layer may comprise liquid crystals and a dichroic dye.

FIG. 1 illustratively shows an exemplary transmittance-variable film according to a first example of the present application. The transmittance-variable film may further comprise a liquid crystal cell attached to the liquid crystal cell via a pressure-sensitive adhesive layer. The transmittance-variable film having such a structure can be referred to as a transmittance-variable film having a double-cell structure. At this time, any one of the two liquid crystal cells can be referred to as a first liquid crystal cell, and the other one can be referred to as a second liquid crystal cell. That is, the transmittance-variable film having the double-cell structure may comprise the first liquid crystal cell (20) and the second liquid crystal cell (30) attached via the pressure-sensitive adhesive layer (10). In the transmittance-variable film having the double-cell structure, one side of the pressure-sensitive adhesive layer may be in contact with the first liquid crystal cell, and the other side of the pressure-sensitive adhesive layer may be in contact with the second liquid crystal cell.

The first liquid crystal cell and the second liquid crystal cell may be overlapped with each other and included. Accordingly, the light transmitted through the first liquid crystal cell can be incident on the second liquid crystal cell, and conversely, the light transmitted through the second liquid crystal cell can also be incident on the first liquid crystal cell.

The first liquid crystal cell may comprise a first substrate, a first liquid crystal layer and a second substrate sequentially. The second liquid crystal cell may comprise a third substrate, a second liquid crystal layer and a fourth substrate sequentially. The first liquid crystal layer and the second liquid crystal layer may each comprise liquid crystals and a dichroic dye. The first substrate, the second substrate, the third substrate and the fourth substrate may each further comprise a base film and an electrode layer on the base film.

The first liquid crystal cell (20) may comprise the first base film (201A), the first electrode layer (202A), the first liquid crystal layer (203), the second electrode layer (202B) and the second base film (201B) sequentially. The second liquid crystal cell (30) may comprise the third base film (301A), the third electrode layer (302A), the second liquid crystal layer (303), the fourth electrode layer (302B) and the fourth base film (301B) sequentially.

One side of the pressure-sensitive adhesive layer (10) may be in contact with the second base film (201B) and the other side may be in contact with the third base film (301A) of the second liquid crystal cell.

The first liquid crystal cell may comprise a sealant (S) that bonds the first substrate and the second substrate together. The second liquid crystal cell may comprise a sealant (S) that bonds the third substrate and the fourth substrate together.

FIG. 2 illustratively shows an exemplary transmittance-variable film according to a second example of the present application. The transmittance-variable film may further comprise an optical member other than the liquid crystal cell attached via the pressure-sensitive adhesive layer. The transmittance-variable film having such a structure can be referred to as a transmittance-variable film having a single-cell structure. The transmittance-variable film having a single-cell structure may comprise a liquid crystal cell (20) and an optical member (50) other than the liquid crystal cell which are attached via a pressure-sensitive adhesive layer (10). In the transmittance-variable film having a single-cell structure, one side of the pressure-sensitive adhesive layer (10) may be in contact with the liquid crystal cell (20) and the other side of the pressure-sensitive adhesive layer may be in contact with the optical member (50).

The contents of the first liquid crystal cell of the double-cell structure can be equally applied to the liquid crystal cell of the single-cell structure, unless otherwise specified. The liquid crystal cell may comprise a first substrate, a liquid crystal layer and a second substrate sequentially. The first substrate and the second substrate may each further comprise a base film and an electrode layer on the base film.

The liquid crystal cell (20) may comprise a first base film (201A), a first electrode layer (202A), a first liquid crystal layer (203), a second electrode layer (202B) and a second base film (201B) sequentially. One side of the pressure-sensitive adhesive layer may be in contact with the second base film (201B) and the other side may be in contact with one side (50) of the optical member. The liquid crystal cell may comprise a sealant (S) that bonds the first substrate and the second substrate together.

The optical member may include, for example, a polarizer, a protective film, or an optical functional film. The optical functional film may comprise a base film and an optical functional layer on one side of the base film.

In this specification, the term polarizer means a film, sheet or element having a polarization function. The polarizer is a functional element capable of extracting light that vibrates in one direction from incident light that vibrates in various directions.

As the polarizer, an absorptive polarizer may be used. In this specification, the absorptive polarizer means an element exhibiting selective transmission and absorption characteristics with respect to incident light. For example, the polarizer may transmit light that vibrates in one direction from incident light that vibrates in various directions, and may absorb light that vibrates in the other directions.

The polarizer may be a linear polarizer. In this specification, the linear polarizer means a case where the selectively transmitting light is linearly polarized light that vibrates in any one direction and the selectively absorbing light is linearly polarized light that vibrates in directions orthogonal to the vibration direction of the linear polarized light.

As the polarizer, for example, a polarizer in which iodine is dyed to a polymer stretched film such as a PVA stretched film, or a guest-host polarizer in which liquid crystals polymerized in an oriented state are used as a host and anisotropic dyes arranged along the orientation of the liquid crystals are used as a guest may be used, without being limited thereto.

According to one example of the present application, a PVA stretched film can be used as the polarizer. The transmittance and the polarization degree of the polarizer can be appropriately adjusted in consideration of the object of the present application. For example, the transmittance of the polarizer may be 42.5% to 55%, and the polarization degree may be 65% to 99.9997%.

As the base film or the protective film, a plastic film can be used. The plastic film mm include TAC (triacetyl cellulose); a COP (cyclo olefin copolymer) such as a norbornene derivative; PMMA (poly(methyl methacrylate); PC (polycarbonate); PE (polyethylene); PP (polypropylene); PVA (polyvinyl alcohol); DAC (diacetyl cellulose); PAC (polyacrylate); PES (poly ether sulfone); PEEK (polyetheretherketon); PPS (polyphenylsulfone), PEI (polyetherimide); PEN (polyethylenemaphthatlate); PET (polyethyleneterephtalate); PI (polyimide); PSF (polysulfone); PAR (polyarylate) or an amorphous fluororesin, and the like, but is not limited thereto.

As described above, the optical functional film may comprise a base film and an optical functional layer on one side of the base film. The optical functional layer may comprise one or more selected from the group consisting of a hard coating layer, an ultraviolet blocking layer, a near infrared blocking layer, an antireflection layer, a fingerprint blocking layer, an antifogging layer and a mirror layer. In the structure in which the liquid crystal cell and the optical functional film are attached via the pressure-sensitive adhesive layer, the base film of the optical functional film may be in contact with the pressure-sensitive adhesive layer.

In the transmittance-variable film according to the first example or the second example, the air contained in the base film or the pressure-sensitive adhesive is transferred to the liquid crystal layer side under high-temperature and high-humidity conditions, so that bubbles may be generated inside the liquid crystal layer or at the interface between the base film and the pressure-sensitive adhesive. Specifically, although the solubility of air according to temperature varies slightly depending on the type of the base film, the solubility of air in the base film generally decreases as the temperature increases, so that the air tends to escape from the base film. At this time, since the electrode layer can serve as a barrier to some extent, for example, the bubbles generated in the base films outside the double-cell structure, for example, the first base film and the fourth base film, can escape more easily to the outside rather than the inside of the liquid crystal layer. However, when bubbles generated in the base films inside the double-cell structure, for example, the second base film and the third base film are not absorbed by the pressure-sensitive adhesive, as shown in FIG. 3, the bubbles pass through the electrode film to penetrate into the liquid crystal layer, thereby generating the bubbles (40) inside the liquid crystal layer, and as shown in FIG. 4, when the bubbles are grown, they cause deformation of the liquid crystal cell. Furthermore, when the bubbles generated in the base film deform the pressure-sensitive adhesive layer, the bubbles are generated not only in the liquid crystal layer but also at the interface between the base film and the pressure-sensitive adhesive layer. In addition, even in the transmittance-variable film with a single-cell structure, when bubbles generated in the base film or the optical member are not absorbed by the pressure-sensitive adhesive, the bubbles are generated inside the liquid crystal layer. Because this generation of bubbles inside the liquid crystal cell is observed in front of the eyes even if they are small bubbles, and thus is visually recognized as external appearance defects, it is not preferred.

An exemplary transmittance-variable film specifies the pressure-sensitive adhesive layer attaching the first liquid crystal cell and the second liquid crystal cell and/or the pressure-sensitive adhesive layer attaching the liquid crystal cell and the optical member other than the liquid crystal cell, whereby the generation of bubbles can be suppressed inside the liquid crystal layer or at the interface between the base film and the pressure-sensitive adhesive layer under high-temperature and high-humidity conditions.

In this specification, the tangent delta (tan δ) value of the pressure-sensitive adhesive layer can be calculated by the following equation 1.

$$\tan \delta = G''/G' \qquad \text{[Equation 1]}$$

In Equation 1, tan δ is a tangent delta value, G" is a loss modulus and G' is a storage modulus, where the loss modulus and the storage modulus are values measured under conditions of 10% strain and 2N axial force.

In Equation 1, the storage modulus (G') may mean the elasticity of the pressure-sensitive adhesive, and the loss modulus (G") may mean the viscosity of the pressure-sensitive adhesive. It can be said that the higher the storage modulus, the harder the pressure-sensitive adhesive is and the higher modulus it has; and it can be said that the higher the loss modulus, the softer the pressure-sensitive adhesive is and the higher viscosity it has.

Since the pressure-sensitive adhesive has elasticity and viscosity simultaneously, it can be expressed by a loss coefficient tan δ value, which is a ratio of the loss modulus to the storage modulus, and it can be said that when the tan δ value is less than 1, the elasticity property is large; and it can be said that when the tan δ value is more than 1, the viscosity property is large.

In the present application, the tan δ value of the pressure-sensitive adhesive layer can be specified so that the generation of bubbles under high-temperature and high-humidity reliability conditions can be suppressed from viscoelastic characteristics of the pressure-sensitive adhesive.

In one example, the pressure-sensitive adhesive layer may have a tan δ value of 0.25 or more to less than 0.5 in a temperature range of 25° C. to 80° C. When the pressure-sensitive adhesive layer having the tan δ value in the above range is applied, the bubble generation can be effectively suppressed under high-temperature and high-humidity reliability conditions. When the tan δ value of the pressure-sensitive adhesive layer is too low, the bubbles generated in the base film are not transferred to the pressure-sensitive adhesive layer due to hard properties, so that the bubbles may be generated inside the liquid crystal layer. When the pressure-sensitive adhesive layer has an excessively high tan δ value, the bubbles generated in the base film deform the pressure-sensitive adhesive layer due to soft properties, so that the bubbles may be generated not only inside the liquid crystal layer but also at the interface between the base film and the pressure-sensitive adhesive layer. Therefore, it is preferable that the tan δ value of the pressure-sensitive adhesive layer is controlled within the above range.

In one example, after the reliability evaluation under conditions of a temperature of 60° C. and 90% relative humidity for 300 hours, the transmittance-variable film may not contain bubbles having a size of 10 μm or more inside the liquid crystal layer. In general, in the case where the size of the bubble is about 10 μm or more, it is possible to set the criterion of the bubble generation evaluation to about 10 μm or more herein in consideration of the fact that it is well visually recognized by the human eye.

The tan δ value of the pressure-sensitive adhesive layer may be specifically 0.25 or more, 0.26 or more, 0.28 or more, 0.30 or more, 0.32 or more, 0.35 or more, or 0.36 or more, and may be less than 0.5, less than 0.48, less than 0.46, less than 0.44, less than 0.42 or less than 0.4.

The reason why bubbles are generated in the transmittance-variable film is because the solubility of air in the base film is lowered while the temperature is raised, and thus, it is preferable that the tan δ value of the pressure-sensitive adhesive layer is specified by the value measured in the temperature range of 25° C. to 80° C.

The tan δ value of the pressure-sensitive adhesive layer may be an average value of tan δ values in a temperature range of 25° C. to 80° C. Specifically, the tan δ value of the pressure-sensitive adhesive layer may be an average value of tan δ values in the temperature range of 25° C. to 60° C.

The loss modulus and the storage modulus of the pressure-sensitive adhesive layer may be adjusted so as to satisfy the tan δ value.

The loss modulus of the pressure-sensitive adhesive layer may be, for example, in a range of 10,000 Pa to 35,000 Pa. The loss modulus of the pressure-sensitive adhesive layer may be 10,000 Pa or more, 12,000 Pa or more, 14,000 Pa or more, 16,000 Pa or more, or 18,000 Pa or more, and may be 35,000 Pa or less, 32,000 Pa or less, 30,000 Pa or less, 28,000 Pa or less, 25,000 Pa or less, 22,000 Pa or less, or 20,000 Pa or less. The loss modulus may mean an average value of loss moduli at a temperature of about 25° C. to 80° C. If the loss modulus is too low, the tan δ value may be excessively lowered, so that there may be a problem that the bubbles are generated in the liquid crystal layer; and if the loss modulus is too high, there may be a problem that the bubbles are generated between the pressure-sensitive adhesive interfaces.

The storage modulus of the pressure-sensitive adhesive layer may be, for example, in a range of 30,000 Pa to 80,000 Pa. The storage modulus of the pressure-sensitive adhesive layer may be specifically 30,000 Pa or more, 35,000 Pa or more, 40,000 Pa or more, 45,000 Pa or more, 50,000 Pa or more, 55,000 Pa or more, or 60,000 Pa or more, and may be 80,000 Pa or less, 75,000 Pa or less, 70,000 Pa or less, or 65,000 Pa or less. The storage modulus may mean an average value of storage moduli at a temperature of about 25° C. to 80° C. If the storage modulus is too low, the tan δ value may be excessively increased, so that there may be a problem that the bubbles are generated between the pressure-sensitive adhesive interfaces; and if the storage modulus is too high, there may be a problem that the bubbles are generated in the liquid crystal layer.

Regarding the thickness of the pressure-sensitive adhesive layer, if the thickness of the pressure-sensitive adhesive layer is too thin, it may not be appropriate to exhibit the bubble generation inhibiting effect under high-temperature and high-humidity reliability conditions. The thicker the thickness of the pressure-sensitive adhesive layer, the more excellent the effect of suppressing bubble generation may be, but if the thickness is too thick, it may not be appropriate in terms of thinning of the transmittance-variable film and appearance unevenness due to increase in thickness of the pressure-sensitive adhesive layer may occur. Furthermore, when the thickness of the pressure-sensitive adhesive increases, the pressure-sensitive adhesive may be softened. As a result, deformation may occur due to structural external force by a lamination pressure or the like in a lamination process. That is, when the thickness of the pressure-sensitive adhesive is too thick, uniform lamination may be difficult. In addition, when the thickness of the pressure-sensitive adhesive layer is increased, the outgassing content may increase in terms of reliability to affect bubble generation.

The thickness of the pressure-sensitive adhesive layer may be in a range of, for example, 30 μm to 120 μm in consideration of this point. The thickness of the pressure-sensitive adhesive layer may be 30 μm or more, 40 μm or more, 50 μm or more, 60 μm or more, 70 μm or more, 80 μm or more, or 90 μm or more, and may be 120 μm or less, 110 μm or less, or 100 μm or less.

The kind of the pressure-sensitive adhesive layer can be appropriately selected within a range that satisfies the tan δ value. In one example, an optically clear adhesive (OCA) may be used as the pressure-sensitive adhesive. The OCA type pressure-sensitive adhesive has a concept different from an OCR (optically clear resin) type pressure-sensitive adhesive provided in a liquid phase, which can be provided mainly as a solid, semi-solid or elastic pressure-sensitive adhesive type. Such an OCA type pressure-sensitive adhesive can be cured, for example, before the objects to be bonded are bonded together to exhibit tackiness. In the present application, as the OCA type pressure-sensitive adhesive, a cured body of a pressure-sensitive adhesive composition known in the art which can be used as the OCA type pressure-sensitive adhesive can be used.

The pressure-sensitive adhesive layer may comprise a pressure-sensitive adhesive composition in a cured state. In this specification, the term "curing" may mean a process that through physical or chemical actions or reactions of components contained in a composition, the composition exhibits adhesiveness or tackiness. In addition, here, the term "cured body" may mean the composition in a cured state. To provide the cured body, application of appropriate energy, for example, heat and/or light irradiation, for curing of the pressure-sensitive adhesive composition may be performed. The energy for curing can be, for example, ultraviolet rays. The application conditions of the energy for curing are not particularly limited as long as they are performed so that the pressure-sensitive adhesive composition can be properly cured.

The pressure-sensitive adhesive composition may comprise, for example, a curable compound. In this specification, the term "curable compound" may mean a compound having one or more curable functional groups. The pressure-sensitive adhesive composition may comprise, for example, a thermosetting compound, an active energy ray curable compound or both of a thermosetting compound and an active energy ray curable compound, In one example, as the curable compound, an acrylic monomer, an epoxy monomer or a silicone monomer may be used, without being limited thereto, and a known monomer component known to be capable of forming a pressure-sensitive adhesive may be used.

In one example, as the pressure-sensitive adhesive layer, for example, an acrylic pressure-sensitive adhesive, a urethane pressure-sensitive adhesive or a silicone pressure-sensitive adhesive may be used, and according to one example of the present application, as the acrylic pressure-sensitive adhesive may be used as the pressure-sensitive adhesive layer.

In one example, as the pressure-sensitive adhesive layer, a commercially available pressure-sensitive adhesive product satisfying the tan δ value may be purchased and used. A commercially available pressure-sensitive adhesive product includes, for example, 9103 and 9104 products from LGC, and the like.

In another example, as the pressure-sensitive adhesive layer, a pressure-sensitive adhesive directly prepared so as to satisfy the tan δ value may also be used. The tan δ value of the pressure-sensitive adhesive may be a viscous/elastic value as shown in Equation 1. Upon preparing the pressure-sensitive adhesive, for example, the curing is performed well using a large amount of the curing agent or the glass transition temperature is increased, and then as the elasticity increases, the tan δ value can be reduced. Upon producing the pressure-sensitive adhesive, for example, the curing is difficult using a small amount of the curing agent or the glass transition temperature is lowered, and then as the viscosity increases, the tan δ value can be increased. Besides, it is known that the tan δ value of the pressure-sensitive adhesive is adjusted, where those skilled in the art can produce a pressure-sensitive adhesive satisfying the above tan δ value based on such technical common sense.

In the transmittance-variable film having the double-cell structure, the first liquid crystal layer and the second liquid crystal layer may each comprise liquid crystals and a dichroic dye. Also, in the transmittance-variable film having the single-cell structure, the liquid crystal layer may comprise liquid crystals and a dichroic dye. Such a liquid crystal layer can be referred to as a guest host liquid crystal layer. Hereinafter, while the liquid crystal layer, the liquid crystals and the dichroic dye are described, their contents can be commonly applied to the first liquid crystal layer and the second liquid crystal layer of the double-cell structure and the liquid crystals and the dichroic dye of the liquid crystal layer in the single-cell structure, unless otherwise specified.

In this specification, the term "guest host liquid crystal layer" may mean a functional layer that dichroic dyes are arranged together depending on arrangement of liquid crystals to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye.

Each thickness of the liquid crystal layers can be appropriately selected in consideration of the object of the present application. Each thickness of the liquid crystal layers may be in a range of, for example, 5 µm to 15 µm, but is not limited thereto, and it can be appropriately changed in consideration of the final thickness and transmittance variation characteristics of the transmittance-variable film and the like.

As the liquid crystals, any kind of liquid crystal compound can be used as long as the orientation direction can be changed by application of external action. For example, as the liquid crystal compound, a smectic liquid crystal compound, a nematic liquid crystal compound, or a cholesteric liquid crystal compound and the like can be used. Furthermore, the liquid crystal compound may be, for example, a compound which does not have a polymerizable group or a crosslinkable group, for example, so that the orientation direction can be changed by application of external action.

The liquid crystal compound may have dielectric constant anisotropy ($\Delta\varepsilon \neq 0$). In one example, the dielectric constant anisotropy of the liquid crystal compound may have a positive value or a negative value. In this specification, the term "dielectric constant anisotropy ($\Delta\varepsilon$)" may mean a difference between an extraordinary dielectric constant ($\varepsilon e$) and an ordinary dielectric constant ($\varepsilon o$) of the liquid crystal compound. The dielectric constant anisotropy of the liquid crystal compound may be, for example, in a range within ±40, within ±30, within ±10, within ±7, within ±5 or within ±3. When the dielectric constant anisotropy of the liquid crystal compound is controlled within the above range, it may be advantageous in terms of driving efficiency of the liquid crystal element.

In this specification, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region.

As the dichroic dye, for example, a known dye known to have properties that can be aligned depending on the alignment state of the liquid crystals can be selected and used. As the dichroic dye, for example, a black dye can be used. Such a dye is known, for example, as an azo dye or an anthraquinone dye, and the like, but is not limited thereto.

The dichroic ratio of dichroic dyes can be appropriately selected in consideration of the object of the present application. For example, the dichroic ratio of the dichroic dye may be in a range of 5 to 20. In this specification, the term "dichroic ratio" may mean, for example, in the case of the p type dye, a value obtained by dividing the absorption of the polarized light parallel to the long axis direction of the dye by the absorption of the polarized light parallel to the direction perpendicular to the long axis direction. The dichroic dye may have the dichroic ratio in at least a part of the wavelengths or any one wavelength within the wavelength range of the visible light region, for example, within the wavelength range of about 380 nm to 700 nm or about 400 nm to 700 nm.

The content of the dichroic dye in the liquid crystal layer can be appropriately selected in consideration of the object of the present application. For example, the content of the dichroic dye in the liquid crystal layer may be in a range of 0.1 wt % to 10 wt %. The ratio of the dichroic dye can be changed in consideration of the desired transmittance and the like.

As the first, second, third and/or fourth base films, a plastic film may be used. The plastic film can be exemplified by a film including TAC (triacetyl cellulose); a COP (cycloolefin copolymer) such as a norbornene derivative; PMMA (poly(methyl methacrylate); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketon); PPS (polyphenyl sulfone), PEI (polyetherimide); PEN (polyethylenemaphthatlate); PET (polyethyleneterephtalate); PI (polyimide); PSF (polysulfone) or PAR (polyarylate).

In one example, in a transmittance-variable film having a double-cell structure, as the first and/or fourth base films, an optically isotropic base film or an optically anisotropic base film may be used. In one example, as the second and/or third base films, an optically isotropic base film, for example, a PC (polycarbonate) film, a COP (cyclo olefin copolymer) film or a PI (polyimide) film may be used.

As each of the first, second, third and/or fourth electrode layers, a transparent conductive layer may be used. The transparent conductive layer may comprise a conductive polymer, a conductive metal, a conductive nanowire or a metal oxide.

In one example, the electrode layer may comprise a transparent metal oxide such as ITO (indium tin oxide), IZO (indium zinc oxide), AZO (aluminum zinc oxide), GZO (gallium zinc oxide), ATO (antimony tin oxide) or $SnO_2$. The transparent metal oxide layer may act as a barrier against bubbles generated in the base film as an inorganic membrane, thereby serving to prevent the bubbles generated in the first and fourth base films from being transferred to the inside of the liquid crystal layer.

The first, second, third and/or fourth electrode layers can transfer an appropriate electric field to the first liquid crystal cell and the second liquid crystal cell in the double-cell structure and the liquid crystal cell in the single-cell structure so as to switch the alignment state of the liquid crystal layer. The direction of the electric field may be the vertical direction, for example, the thickness direction of the liquid crystal cell.

An exemplary transmittance-variable film may further comprise an alignment film. In one example, the first substrate, the second substrate, the third substrate and/or the fourth substrate may each comprise an alignment film provided on one side of the electrode layer, for example, on the opposite side surface of the electrode layer to the base film.

When the transmittance-variable film further comprises an alignment film, the first liquid crystal cell may comprise a first base film, a first electrode layer, a first alignment layer, a first liquid crystal layer, a second alignment layer, a second electrode layer and a second base film sequentially, and the second liquid crystal cell may comprise a third base film, a third electrode layer, a third alignment layer, a second liquid crystal layer, a fourth alignment layer, a fourth electrode layer and a fourth base film sequentially. The liquid crystal cell having the single-cell structure may be the same as the structure of the first liquid crystal cell.

In one example, the alignment film may be a vertical alignment film. The vertical alignment film may be a rubbing alignment film or a photo alignment film. In the case of the rubbing alignment film, the orientation direction is determined by the rubbing direction, and in the case of the photo alignment film, it is determined by the polarization direction of the irradiated light.

The pretilt angle and the pretilt direction of the vertical alignment film may be implemented by appropriately adjusting orientation conditions, for example, a rubbing condition or a pressure condition upon rubbing, or optical orientation conditions, for example, a polarizing state of light, an irradiation angle of light, an irradiation intensity of light, and the like.

In this specification, the pretilt may have an angle and a direction. The pretilt angle may be referred to as a polar angle, and the pre-tilt direction may also be referred to as an azimuthal angle. The pretilt angle may mean an angle formed by the director of the liquid crystal molecule relative to a horizontal plane with the alignment film or an angle formed with the surface normal direction of the liquid crystal cell.

The pretilt angle of the vertical alignment film may be in a range of 70 degrees to 89 degrees. When the pretilt angle is within the above range, the vertical alignment state at the time of no voltage application can be induced in the liquid crystal cell. In addition, when the pretilt angle is within the above range, it is possible to provide a transmittance-variable film having excellent initial transmittance. In one example, the pretilt angle may be about 71 degrees or more, 72 degrees or more, about 73 degrees or more, or about 74 degrees or more, and may be about 88.5 degrees or less, or about 88 degrees or less.

The sealant may comprise a curable resin in a cured state. The curable resin may be an ultraviolet curable or thermosetting resin. As the sealant, an acrylate-based sealant, an epoxy-based sealant, a urethane-based sealant, a phenol-based sealant or a mixture thereof may be used, without being limited thereto. The thickness of the sealant may be appropriately adjusted in consideration of the thickness of the desired liquid crystal layer.

The first liquid crystal cell and the second liquid crystal cell of the transmittance-variable film having the double-cell structure or the liquid crystal cell of the transmittance-variable film having the single-cell structure may each further comprise a spacer. The spacer may serve to maintain the cell gap of the first liquid crystal cell while being between the first substrate and the second substrate and to maintain the cell gap of the second liquid crystal cell while being between the third substrate and the fourth substrate. The liquid crystal cell of the transmittance-variable film having the single-cell structure may be the same as the structure of the first liquid crystal cell.

As the spacer, a column spacer or a ball spacer may be used. The spacer may comprise one or more selected from the group consisting of a carbon-based material, a metal-based material, an oxide-based material, and a composite material thereof. The spacer may be formed on any one of the first and second substrates or any one of the third and fourth substrates. In the case of a transmittance-variable film having the double-cell structure, it may be formed on the first substrate in the first liquid crystal cell, and it may be formed on the fourth substrate in the second liquid crystal cell. In the case of the transmittance-variable film having the single-cell structure, it may be formed on the first substrate of the liquid crystal cell.

In one example, the column spacer may be formed before forming the alignment film on the electrode layer. In one example, upon coating the alignment film on the electrode layer, the ball spacer may be formed by mixing the ball spacer with the alignment film and coating the mixture. The width and the thickness of the spacer may be appropriately changed according to the size of the final target product.

An exemplary transmittance-variable film can change the transmittance by switching the orientation direction depending on whether or not a voltage is applied to the first liquid crystal cell and the second liquid crystal cell of the double-cell structure and the liquid crystal cell of the single-cell structure. The liquid crystal and the dichroic dye may be aligned according to the orientation direction. Therefore, the orientation direction may be parallel to the optical axis direction of the liquid crystal and/or the absorption axis direction of the dichroic dye.

In one example, the first liquid crystal cell and the second liquid crystal cell of the double-cell structure and/or the liquid crystal cell of the single-cell structure can each switch the vertical orientation and the horizontal orientation by voltage application. At this time, the orientation directions of the first liquid crystal cell and the second liquid crystal cell of the double-cell structure in the horizontally oriented state may form 80 degrees to 100 degrees from each other.

In one example, the transmittance-variable film may implement a clear state when the first liquid crystal cell and the second liquid crystal cell of the double-cell structure are each in the vertically oriented state, and may implement a dark state when they are each in the horizontally oriented state. In one example, the transmittance-variable film may implement a clear state when the liquid crystal cell of the single-cell structure is in the vertically oriented state, and may implement a dark state when the liquid crystal cell is in the horizontally oriented state. In this specification, the clear state may mean a high transmittance state, and the dark state may mean a low transmittance state.

In one example, in the case of the transmittance-variable film having the double-cell structure, the transmittance in the clear state may be 40% or more, 45% or more, or 50% or more, and the transmittance in the dark state may be 5% or less, 4% or less, or 3% or less. In another example, in the case of the transmittance-variable film having the single-cell structure, the transmittance in the clear state may be 30% or more, and the transmittance in the dark state may be 15% or less.

In this specification, the transmittance may mean the linear light transmittance for the vertical light. Here, the vertical light is the light incident in the direction parallel to the normal direction of the surface of the transmittance-variable film and the linear light transmittance of the vertical light is a percentage of the light transmitted in the direction parallel to the normal direction among the vertical light incident on the surface of the transmittance-variable film.

FIG. 5 illustratively shows a transmittance control principle of a transmittance-variable film having a double-cell structure. The left view (A) in FIG. 5 is in a state where no voltage is applied and the right view (B) is in a voltage applied state. The area of the arrow means the transmitted light quantity. In the left and right views, the upper layer means a first liquid crystal cell, the lower layer means a second liquid crystal cell, the gray ellipse means a liquid crystal having negative dielectric constant anisotropy, and the black ellipse means a dichroic dye. In the exemplary transmittance-variable film, when no voltage is applied, the first liquid crystal cell and the second liquid crystal cell each exist in a vertically oriented state and the transmitted light quantity is relatively increased, so that the clear state can be implemented. In the exemplary transmittance-variable film, when the voltage is applied, the first liquid crystal cell and the second liquid crystal cell may each be in a horizontally oriented state. The uniaxial orientation direction of the first liquid crystal cell and the uniaxial orientation direction of the second liquid crystal cell may form about 80 degrees to 100 degrees from each other. In this case, since the absorption axes of the first liquid crystal cell and the second liquid crystal cell may form about 80 degrees to 100 degrees, the transmitted light quantity is relatively reduced by the cross pole effect, so that the dark state may be implemented. The transmittance-variable film can be switched to the clear state when the voltage is removed.

Such a transmittance-variable film may be applied to various applications. The applications to which the transmittance-variable film can be applied can be exemplified by openings in enclosed spaces including buildings, containers or vehicles, and the like, such as windows or sunroofs, or eyewear, and the like.

Here, in the range of eyewear, all eyewear formed so that an observer can observe the outside through lenses, such as general glasses, sunglasses, sports goggles or helmets, or instruments for experiencing augmented reality, can be included. In particular, upon using the augmented reality instrument outdoors, the image is not visible due to bright sunlight when operating the instrument, and thus, it is necessary to temporarily reduce the transmittance when using from outside, so that it may be more advantageous when the transmittance-variable film with the double-cell structure having excellent transmittance reduction characteristics is applied.

When the transmittance-variable film of the present application is applied to an apparatus requiring variable transmittance, other constitutions of the apparatus are not particularly limited, which may have various known designs. In one example, when the transmittance-variable film is applied to eyewear, the transmittance-variable film may be mounted on lenses for a left eye and/or a right eye having a known eyewear structure and used, and other constitutions of the eyewear are not particularly limited, which may have various known designs.

Advantageous Effects

The present application can provide a transmittance-variable film having a double-cell structure or a single-cell structure capable of suppressing formation of bubbles inside a liquid crystal layer or at the interface between a base film and a pressure-sensitive adhesive layer under high-temperature and high-humidity reliability conditions. An exemplary transmittance-variable film can be applied to various applications, including various construction or automotive materials that require control of transmittance, or eyewear, such as augmented reality experience or sports goggles, sunglasses or helmets.

MODE FOR INVENTION

Hereinafter, the present application will be described in detail by way of examples according to the present application, but the scope of the present application is not limited by the following examples.

Production Example 1. Production of Liquid Crystal Cell

After a COP film (ZF14, Zeon Co.) was used as a base film and ITO (indium tin oxide) was deposited in a roll state, a polyimide-based vertical alignment film (SE5661, Nissan Chemical) was coated using a gravure coater to a thickness of 500 nm, rubbed, and then cut to a size of about 100 mm×100 mm to produce a first substrate and a second substrate. At this time, in order to maintain the cell gap in the case of the first substrate, a column spacer having a diameter of 20 μm and a height of 10 μm was formed before coating the alignment film. A sealant was applied to the edge portion on the alignment film of the first substrate and a liquid crystal composition was applied inside the edge of the sealant. The liquid crystal composition comprises liquid crystals (HNG 7306, HCCH company) having negative dielectric constant anisotropy and an anisotropic dye (X12, BASF). The second substrate was laminated on the first substrate and then irradiated with light having a UVA wavelength region at a light quantity of 2000 mJ/cm$^2$ to cure the sealant, thereby producing a liquid crystal cell.

Production Example 2. Transmittance-Variable Film with Double-Cell Structure

A transmittance-variable film with a double-cell structure of the structure of FIG. 1 was produced. Specifically, a first liquid crystal cell was produced in the same manner as in Production Example 1. Furthermore, a second liquid crystal cell was produced in the same manner as in Production Example 1. The second liquid crystal cell comprised a third substrate, a second liquid crystal layer and a fourth substrate sequentially, where a spacer was formed on the fourth substrate like the first substrate, a sealant and a liquid crystal composition were applied, and then the third substrate was laminated. All the substrates of the first and second liquid crystal cells were produced so as to have the direction at the time of horizontal orientation through rubbing treatment in the alignment film.

The produced first liquid crystal cell and second liquid crystal cell were bonded together with a pressure-sensitive adhesive, so that the orientation directions at the time of horizontal orientation formed 90 degrees from each other, specifically, so that the rubbing directions formed 90 degrees from each other, to produce a transmittance-variable film with a double-cell structure. The pressure-sensitive adhesive is in contact with the second base film of the first liquid crystal cell and the third base film of the second liquid crystal cell.

Production Example 3. Transmittance-Variable Film with Single-Cell Structure

A transmittance-variable film with single-cell structure, to which an optical member was attached, of the structure of FIG. 2 was produced. Specifically, after a liquid crystal cell was produced in the same manner as in Production Example 1, the liquid crystal cell and a polycarbonate film that a hard coating layer was formed on one side were bonded together with a pressure-sensitive adhesive to produce a transmittance-variable film with a single-cell modified structure. The pressure-sensitive adhesive is in contact with the second base film of the liquid crystal cell and the polycarbonate film.

Evaluation Example 1. Evaluation of Air Solubility According to Temperature

For various samples of Table 1 below, air solubility according to temperature was evaluated, and the results were described in Table 1 below. In Table 1 below, the PC film is a polycarbonate film, the COP film is a cyclo olefin polymer film, the PET film is a polyethylene terephthalate film, the OCA is an optically clear adhesive, the Host LC means a host liquid crystal of the liquid crystal cell, and the SRF ITO AR film means a film in which an ITO layer and an AR layer (anti-reflection layer) are sequentially formed on an SRF (super retardation film). For the air solubility according to temperature, the pressure according to temperature change was measured by attaching a pressure sensor (PX409S200, Omega) to one side of the gasket, placing a sample to be measured between the gaskets and then sealing it. The solubility of each base material could be calculated from the measured pressure in accordance with the Henry's law of the following equation 2.

$$H^{cp}=Ca/P \quad \quad [\text{Equation 2}]$$

In Equation 2 above, $H^{cp}$ is Henry's solubility, Ca is the number of moles of the air dissolved in the base material/volume of the base material, and P is the partial pressure of air in the atmosphere.

As a result of the evaluation, it can be confirmed that the solubility of the air dissolved in the base film is lowered as the temperature is increased, although the solubility differs depending on the type of the base film. If the solubility of air in the base film is lowered, the pressure of the air in the base film is increased and the air in the base material moves to the outside until the pressure in the base film is equilibrated with the external pressure, so that it may be causative of bubble generation inside the liquid crystal layer. In Table 1 below, STP (standard temperature and pressure) means a temperature of 25° C. and a pressure of 1 atm.

TABLE 1

| Thickness of each sample: | Solubility (mm³(STP, air)/mm³(film)/atm) | |
| --- | --- | --- |
| 100 μm | 25° C. | 59° C. |
| PC film (C110, Tejin) | 0.171 | 0.07 |
| COP film (ZF14, Zeon) | 0.127 | 0.05 |
| PET film (T604, Mitsuibishi) | 0.025 | 0.02 |
| OCA (SA114, New Tac Kasei) | 0.047 | 0.048 |
| Host LC (HNG 7306, HCCH) | 0.049 | 0.050 |
| OCA (OC9102, LGC) | 0.076 | 0.079 |
| SRF ITO AR film | 0.031 | 0.006 |

Evaluation Example 2. Evaluation of Air Movement According to Electrode Layer Position Reference Example 1 and Reference Example 2 were prepared in order to evaluate the movement of air according to the position of the electrode layer.

Reference Example 1. Single Cell

A sample of the structure of FIG. 6 was produced, but a liquid crystal cell was produced according to the production method of the liquid crystal cell of Production Example 1.

Reference Example 2. Single Cell Deformation

A sample of the structure of FIG. 7 was produced, but in the production method of the liquid crystal cell of Production Example 1 above, it was equally produced, except that the electrode layer was made to face the outside of the base film, instead of the inside of the base film.

For Reference Example 1 and Reference Example 2, it was observed whether or not bubbles were generated after reliability evaluation under conditions of a temperature of 60° C. and 90% relative humidity for 300 hours, and the results were shown in FIG. 8 (A: Reference Example 1, B: Reference Example 2). As shown in FIG. 8, it can be confirmed that in Reference Example 1, bubbles are not generated in the liquid crystal layer, but in Reference Example 2 in which the electrode layer is formed outside, bubbles are generated in the liquid crystal layer. It can be seen that the gas generated in the base film on which the electrode layer is deposited moves to the opposite side of the deposition surface of the electrode layer to generate bubbles. That is, due to the barrier property of the electrode layer of the inorganic membrane, the difference in the speed at which the gas inside the base film moves in both plane directions occurs.

Evaluation Example 3. Measurement of Elastic Modulus and Tan 45 in Pressure-Sensitive Adhesive For Pressure-sensitive adhesives 1 to 5, storage moduli, loss moduli and tan δ values were measured. Specifically, a pressure-sensitive adhesive was prepared as a circular sample having a diameter of 8 mm and a thickness of 1 mm, and then they were measured under conditions of 10% strain, 2N axial force and dynamic frequency sweep using an ARES-G2 Rheometer from instruments while the temperature was raised from −25° C. to 80° C. at a rate of 5° C. per minute.

FIG. 9 shows loss moduli, storage moduli and tan δ values of Pressure-sensitive adhesives 1 to 4 according to temperature. FIG. 10 shows loss moduli, storage moduli and tan δ values of Pressure-sensitive adhesives 3 (A3) and 5 (A5) according to temperature. Pressure-sensitive adhesive 5 is an OCA of acrylate series, which comprises EHA (ethylhexyl acrylate), IBOA (isobornyl acrylate) and HEA (hydroxyethyl acrylate), and has a molecular weight in a level of 30,000.

In addition, for Pressure-sensitive adhesives 1 to 5, the average value of tan δ from 25° C. to 60° C. and the average value of tan δ from 25° C. to 80° C. were described in Table 2 below.

TABLE 2

| | Pressure-sensitive adhesive | | | | |
| --- | --- | --- | --- | --- | --- |
| | 1 (SA114, New Tac Kasei) | 2 (9102, LGC) | 3 (9103, LGC) | 4 (9104, LGC) | 5 (manufactured by LGC) |
| tanδ average (25° C.-60° C.) | 0.36 | 0.23 | 0.30 | 0.53 | 0.83 |
| tanδ average (25° C.-80° C.) | 0.35 | 0.20 | 0.28 | 0.56 | 0.75 |

Evaluation Example 4. Evaluation of Bubble Generation According to Tan 45 Value of Pressure-Sensitive Adhesive Examples 1 to 2 and Comparative Examples 1 to 2 below were prepared in order to evaluate bubble generation according to tan δ value of the pressure-sensitive adhesive.

Example 1

According to Production Example 2 above, a transmittance-variable film with a double-cell structure was prepared, but Pressure-sensitive adhesive 1 (SA114, New Tac Kasei) was used as a pressure-sensitive adhesive layer in a thickness of 100 μm.

Example 2

According to Production Example 2 above, a transmittance-variable film with a double-cell structure was prepared, but Pressure-sensitive adhesive 3 (9103, LGC) was used as a pressure-sensitive adhesive layer in a thickness of 100 μm.

Comparative Example 1

According to Production Example 2 above, a transmittance-variable film with a double-cell structure was prepared, but Pressure-sensitive adhesive 2 (9102, LGC) was used as a pressure-sensitive adhesive layer in a thickness of 100 μm.

Comparative Example 2

According to Production Example 2 above, a transmittance-variable film with a double-cell structure was prepared, but Pressure-sensitive adhesive 4 (9104, LGC) was used as a pressure-sensitive adhesive layer in a thickness of 100 μm.

After Examples 1 and 2 and Comparative Examples 1 and 2 were subjected to reliability evaluation under conditions of a temperature of 60° C. and 90% relative humidity for 300 hours, it was observed whether or not bubbles were generated, and the results were shown in FIG. 11 (A: Example 1, B: Comparative Example 1, C: Example 2, D: Comparative Example 2). As shown in FIG. 11, it can be confirmed that bubbles are less generated in Examples 1 and 2 using the pressure-sensitive adhesive having the tan δ value of the present application, as compared with Comparative Examples 1 and 2. When a hard pressure-sensitive adhesive having a low tan δ value was used as in Comparative Example 1, bubbles were induced inside the liquid crystal layer because air generated in the base film was hardly transferred to the pressure-sensitive adhesive. When a soft pressure-sensitive adhesive having a high tan δ value was used as in Comparative Example 2, bubbles were generated inside the liquid crystal layer, and bubbles were also generated at the interface between the base film and the pressure-sensitive adhesive. In the case of the soft pressure-sensitive adhesive, air generated in the base film causes deformation of the pressure-sensitive adhesive, and bubbles are generated at the interface between the base film and the pressure-sensitive adhesive.

In addition, a transmittance-variable film with a double-cell structure was produced according to Production Example 2 above, but two samples (Example 1-1 and Example 1-2, respectively) were further prepared, in which Pressure-sensitive adhesive 1 (SA114, New Tac Kasei) was used as a pressure-sensitive adhesive layer in a thickness of 100 μm, and as a result of reliability evaluation under conditions of a temperature of 60° C. and 90% relative humidity for 300 hours, as shown in FIG. 12 (A-1: Example 1-1 and A-2: Example 1-2), it was re-verified that bubbles were not generated in both samples.

Evaluation Example 5. Evaluation of Bubble Generation According to Tan δ Value of Pressure-Sensitive Adhesive Example 3 and Comparative Example 3 below were prepared in order to evaluate bubble generation according to tan δ value of the pressure-sensitive adhesive.

Example 3

According to Production Example 2 above, a transmittance-variable film with a single-cell structure, to which an optical member was attached, was prepared, but Pressure-sensitive adhesive 3 (9103, LGC) was used as a pressure-sensitive adhesive layer in a thickness of 100 μm.

Comparative Example 3

According to Production Example 2 above, a transmittance-variable film with a single-cell structure, to which an optical member was attached, was prepared, but Pressure-sensitive adhesive 5 (manufactured by LGC) was used as a pressure-sensitive adhesive layer in a thickness of 100 μm.

After Example 3 and Comparative Example 3 were subjected to reliability evaluation under conditions of a temperature of 60° C. and 90% relative humidity for 24 hours, it was observed whether or not bubbles were generated, and the results were shown in FIG. 13. As shown in FIG. 13 (A: before high-temperature and high-humidity storage of Example 3, B: after high-temperature and high-humidity storage of Example 3, C: before high-temperature and high-humidity storage of Comparative Example 3, D: after high-temperature and high-humidity storage of Comparative Example 3), it can be confirmed that bubbles are less generated in Example 3 using the pressure-sensitive adhesive having the tan δ value of the present application, as compared with Comparative Example 3. When a soft pressure-sensitive adhesive having a high tan δ value was used as in Comparative Example 3, bubbles were generated inside the liquid crystal layer, and bubbles were also generated at the interface between the base film and the pressure-sensitive adhesive. In the case of the soft pressure-sensitive adhesive, air generated in the base film causes deformation of the pressure-sensitive adhesive, and bubbles are generated at the interface between the base film and the pressure-sensitive adhesive.

EXPLANATION OF REFERENCE NUMERALS AND SYMBOLS

10: pressure-sensitive adhesive layer,
20: first liquid crystal cell,
30: second liquid crystal cell,
20A: first substrate,
20B: second substrate,
30A: third substrate,
30B: fourth substrate,
40: bubble,
50: optical member,
201A, 201B, 301A, 301B: base film,
202A, 202B, 302A, 302B: electrode layer,
203, 303: liquid crystal layer,
S: sealant

The invention claimed is:

1. A transmittance-variable film comprising:
a liquid crystal cell including a first substrate, a liquid crystal layer including liquid crystals and a dichroic dye, and a second substrate, and
a pressure-sensitive adhesive layer disposed on one side of the liquid crystal cell, wherein the pressure-sensitive adhesive layer has a first average value of a tangent delta (tan δ) represented by the following equation 1 of 0.25 or more to less than 0.5 over a temperature range of 25° C. to 80° C.:

tan δ=G″/G'  [Equation 1]

wherein, G″ is a loss modulus and G' is a storage modulus, wherein the loss modulus and the storage modulus are values measured under conditions of 10% strain, 2N axial force, and a dynamic frequency sweep while raising the temperature from −25° C. to 80° C. at a rate of 5° C. per minute,
wherein the first average value is an average of values of the tan δ at 5° C. intervals from 25° C. to 80° C.,
wherein G″ is in a range of 10,000 Pa to 35,000 Pa, G' is in a range of 30,000 Pa to 80,000 Pa, or a combination thereof.

2. The transmittance-variable film according to claim 1, wherein the pressure-sensitive adhesive layer has a second average value of the tan δ of 0.25 or more to less than 0.5 over a temperature range of 25° C. to 60° C., wherein the second average value is an average of values of the tan δ at 5° C. intervals from 25° C. to 60° C.

3. The transmittance-variable film according to claim 1, wherein the pressure-sensitive adhesive layer has a thickness in a range of 30 μm to 120 μm.

4. The transmittance-variable film according to claim 1, wherein G″ is in a range of 10,000 Pa to 35,000 Pa.

5. The transmittance-variable film according to claim 1, wherein G' is in a range of 30,000 Pa to 80,000 Pa.

6. The transmittance-variable film according to claim 1, wherein the pressure-sensitive adhesive layer is an optically clear adhesive layer.

7. The transmittance-variable film according to claim 1, wherein the pressure-sensitive adhesive layer comprises an acrylic pressure-sensitive adhesive, a urethane pressure-sensitive adhesive or a silicone pressure-sensitive adhesive.

8. The transmittance-variable film according to claim 1, wherein the first substrate and the second substrate each comprise a base film and an electrode layer on the base film.

9. The transmittance-variable film according to claim 1, wherein the transmittance-variable film does not contain bubbles having a size of 10 μm or more inside the liquid crystal layer after reliability evaluation under conditions of a temperature of 60° C. and 90% relative humidity for 300 hours.

10. The transmittance-variable film according to claim 1, further comprising a second liquid crystal cell attached via the pressure-sensitive adhesive layer, wherein the second liquid crystal cell comprises a third substrate, a second liquid crystal layer including liquid crystals and a dichroic dye and a fourth substrate sequentially.

11. The transmittance-variable film according to claim 1, further comprising an optical member other than the liquid crystal cell attached via the pressure-sensitive adhesive layer.

12. The transmittance-variable film according to 12, wherein the optical member comprises a polarizer, a protective film or an optical functional film.

13. An augmented reality instrument comprising the transmittance-variable film of claim 1.

14. The transmittance-variable film according to claim 1, wherein each value of the tan δ ranges from 0.25 or more to less than 0.5 over a temperature range of 25° C. to 80° C.

* * * * *